(12) United States Patent
Lledos

(10) Patent No.: US 6,406,520 B1
(45) Date of Patent: Jun. 18, 2002

(54) ADSORBENT HAVING IMPROVED SELECTIVITY FOR THE SEPARATION OF GASES

(75) Inventor: Bernard Lledos, Guyancourt (FR)

(73) Assignee: L'Air Liquide, Societe Anonyme a Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 30 days.

(21) Appl. No.: 09/597,167

(22) Filed: Jun. 20, 2000

(30) Foreign Application Priority Data

Jul. 22, 1999 (FR) .............................................. 99 09516

(51) Int. Cl.$^7$ ............................................. B01D 53/047
(52) U.S. Cl. ................................ 95/96; 95/130; 95/139; 95/140; 95/902
(58) Field of Search ............................ 95/96–103, 130, 95/139, 140, 902; 96/108, 130, 143

(56) References Cited

U.S. PATENT DOCUMENTS

| | | | |
|---|---|---|---|
| 3,140,933 A | | 7/1964 | McKee |
| 4,775,396 A | | 10/1988 | Rastelli et al. |
| 4,859,217 A | | 8/1989 | Chao |
| 4,943,304 A | * | 7/1990 | Coe et al. ...................... 95/130 |
| 5,152,813 A | * | 10/1992 | Coe et al. .................. 95/130 X |
| 5,246,689 A | | 9/1993 | Beck et al. |
| 5,258,058 A | * | 11/1993 | Coe et al. .................. 95/130 X |
| 5,378,440 A | | 1/1995 | Herbst et al. |
| 5,559,070 A | | 9/1996 | Torii et al. |
| 5,616,170 A | * | 4/1997 | Ojo et al. .................. 95/130 X |
| 5,672,195 A | * | 9/1997 | Moreau et al. ............. 95/130 X |
| 5,868,818 A | * | 2/1999 | Ogawa et al. .............. 95/130 X |
| 5,922,107 A | * | 7/1999 | Labasque et al. .......... 95/130 X |
| 6,068,678 A | * | 5/2000 | Labasque et al. .......... 95/130 X |
| 6,068,682 A | * | 5/2000 | Kuznicki et al. ........... 95/902 X |
| 6,136,069 A | * | 10/2000 | MacDougall et al. ..... 95/130 X |
| 6,143,057 A | * | 11/2000 | Bulow et al. .............. 95/130 X |
| 6,165,428 A | * | 12/2000 | Eijkhoudt et al. ......... 95/902 X |
| 6,171,370 B1 | * | 1/2001 | Hirano et al. .............. 95/130 X |
| 6,183,537 B1 | * | 2/2001 | Schaub et al. ............. 95/130 X |
| 6,270,556 B1 | * | 8/2001 | Rouge et al. .............. 95/130 X |

FOREIGN PATENT DOCUMENTS

| | | |
|---|---|---|
| EP | 0 685 258 | 12/1995 |
| EP | 0 893 156 | 1/1999 |
| GB | 824 825 | 12/1959 |
| GB | 976023 | 11/1964 |

* cited by examiner

Primary Examiner—Robert H. Spitzer
(74) Attorney, Agent, or Firm—Young & Thompson

(57) ABSTRACT

A porous adsorbent includes pores having a pore diameter (Dm) of between 1 nm and 14 nm and an oxygen adsorptivity, measured at +20° C. and 1 bar, of at most 10 Scc/g. This adsorbent is used in a process for adsorbing at least one gaseous compound contained in a gas mixture containing several gaseous compounds of different polarity. Preferably, the gas mixture to be separated or to be purified is chosen from mixtures containing oxygen and nitrogen, particularly air, mixtures containing carbon monoxide and hydrogen, and hydrocarbons, especially olefins, advantageously, the process is of the PSA or VSA type.

14 Claims, 1 Drawing Sheet

ADSORBENT HAVING IMPROVED SELECTIVITY FOR THE SEPARATION OF GASES

FIELD OF THE INVENTION

Figure 1:
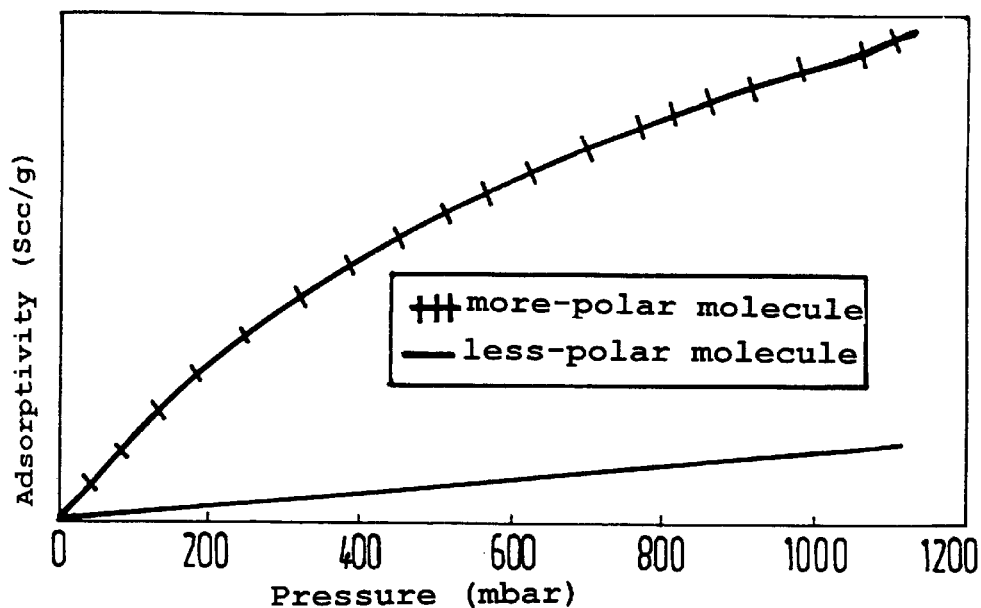

The invention relates to a process for separating or for purifying gases by adsorption, especially PSA, TSA or VSA processes, using an adsorbent having improved selectivity.

BACKGROUND OF THE INVENTION

Cyclic adsorption processes of the PSA (Pressure Swing Adsorption), TSA (Temperature Swing Adsorption) and VSA (Vacuum Swing Adsorption) type are widely used at the present time for the production of gases. Thus, mention may be made, for example, of the separation of the gases in air by preferential adsorption of nitrogen so as to produce oxygen by the VSA process.

To do this, zeolites, especially of the LTA or FAU type, essentially X or LSX zeolites, are the adsorbents most commonly used in the adsorption processes.

Conventionally, the adsorbents preferred for the separation of gases, and more particularly of air, are zeolites that are highly exchanged, generally exchanged to more than 80%, with alkali or alkaline earth metals, such as lithium, calcium, strontium or barium, or with transition metals, such as aluminum, copper or zinc, or with mixtures of these cations.

By way of example, mention may be made of documents U.S. Pat. Nos. 5,268,023, 5,174,979, 4,859,217, 5,152,813, 4,481,018, 5,419,891, EP-A-589406 and EP-A-589391.

Such zeolites are usually synthesized in the form of a powder of crystals having micron-size dimensions. However, this pulverulent form cannot be used directly in cyclic gas separation processes or in catalytic processes since the powder would be entrained by the pressurized gas streams.

Consequently, a forming step, for example using extrusion or ball formation, is required.

For these granulates, the size and the shape which are most adapted to the process in which they have to be processed are chosen.

This processing gives the adsorbent in particular its mechanical properties, such as the compressive strength, and its kinetic properties.

At the present time, no law governing the general behaviour has been able to be developed, knowing that it is very difficult to relate the parameters of the process to the parameters of the adsorbent. All the same, it is known that the properties of the adsorbent, and especially those associated with its forming, play a paramount role in the overall efficacy of the processes.

Furthermore, it is well known that the separation of gases for the purpose of their production may be accomplished, when they differ in polarity, by selective adsorption of the more polar molecules with respect to the less polar molecules on porous adsorbents.

For example, mention may be made of the separation of the gases in air for the purpose of producing oxygen by selective adsorption of nitrogen on zeolitic molecular sieves.

These adsorbents are generally used in cyclic processes of the PSA type, making use of one or more beds of adsorbents and various steps, among which are the production of gases by adsorption of the polar molecule carried out at a high pressure and the regeneration of the adsorbent carried out at a low pressure.

In the case of the separation of the gases in air, the low pressure is generally less than atmospheric pressure (vacuum) and the high pressure is slightly greater than atmospheric pressure. These processes are then called VSA processes.

These adsorbents, used in these processes, especially PSA or VSA processes, are characterized by different thermodynamic parameters with respect to the process in which they are used, namely especially:

the adsorptivity $Q_{N_2}$ for the polar molecule, for example nitrogen, defined at a given pressure and a given temperature, for example 20° C. and 1 bar;

the adsorptivity $Q_{O_2}$ for the less-polar molecule, for example oxygen, defined at a given pressure and a given temperature, for example 20° C. and 1 bar;

the adsorption selectivity $[Q_{N_2}]/[Q_{O_2}]$ defined as the ratio of the adsorptivities for the pure molecules at a given pressure and a given temperature, for example 20° C. and 1 bar.

These parameters are illustrated in FIG. 1 appended hereto.

The "selectivity" parameter is paramount for the production of gases since increasing it will make it possible not only to increase the efficiency of the operation of separating the gas mixture but also to lower the energy consumption associated with the production of the gas and to increase the productivity of the process.

It is therefore necessary, in these gas separation processes using adsorption of more polar molecules, for the purpose of producing a less-polar molecule, to use, in cyclic adsorption processes, adsorbent material having the highest adsorption selectivity as defined above.

A means of obtaining a high selectivity consists in using an adsorbent whose adsorptivity for the less-polar molecules is as low as possible.

However, having said this, the problem which arises is then to reduce the adsorptivity of an adsorbent for the less-polar molecules, such as oxygen, as far as possible so as to increase the selectivity of the said adsorbent for the more-polar molecules, such as nitrogen, and thus to improve the gas separation or purification processes using such adsorbents having improved selectivity.

SUMMARY OF THE INVENTION

The solution provided by the invention therefore relates to a porous adsorbent comprising pores having a pore diameter (Dm) of between 1 nm and 14 nm and having an oxygen adsorptivity, measured at +20° C. and 1 bar, of at most 10 Scc/g.

In fact, the inventor of the present invention has shown, quite surprisingly, that there exists a correlation between the adsorptivity for oxygen, the less-polar molecule, and the mean pore radius of the adsorbent used in the separation process, this being so up to a pore radius of approximately 1.4 nanometers.

Above this limit the increase in pore diameter of the adsorbent material now has only a very minor effect on the adsorptivity of the less-polar molecules, such as oxygen.

Thus, the use of porous adsorbent materials whose mean pore radius has dimensions greater than or equal to 1.4 nm therefore makes it possible to limit the adsorption of less-polar molecules, for example oxygen, and consequently makes the processes for producing these molecules more economical and acceptable from the industrial standpoint.

Moreover, it should be emphasized that, although the porous adsorbent of the invention is defined by its oxygen adsorptivity, the adsorbent may be used for separating gas mixtures other than air or oxygen/nitrogen mixtures, as explained below; in other words, the invention is in no way limited to these particular gas mixtures.

Depending on the case, the adsorbent according to the invention may also comprise one or more of the following characteristics:

- the pore diameter (Dm) is between 1.2 nm and 10 nm, preferably between 1.4 nm and 5 nm;
- the oxygen adsorptivity of the adsorbent, measured at +20° C. and 1 bar, is between 0.1 and 8 Scc/g, preferably between 0.5 and 7 Scc/g and even more preferably from 1 to 5 Scc/g;
- it comprises an adsorbent active phase and at least one inert binder;
- the adsorbent active phase is chosen from crystalline or amorphous, cationic porous materials;
- the inert binder is chosen from clays, silicas, aluminas and alumino-silicates;
- the ratio of the proportion by weight of adsorbent active phase to the proportion by weight of inert binder is from 95/5 to 5/95, preferably from 50/50 to 90/10;
- the adsorbent active phase contains one or more metal cations, preferably lithium, calcium, zinc or iron cations or cations chosen from Groups I, II, VII, X, XI, XII and F from the Periodic Table of Elements according to IUPAC and the zeolitic phase is preferably exchanged to at least 80% with one or more metal cations, preferably to at least 90%.

Moreover, such an adsorbent can be used for adsorbing at least one gaseous compound contained in a gas mixture containing several gaseous compounds of different polarity.

Furthermore, the invention also relates to a process for separating or for purifying a gas mixture containing at least one polar first gaseous compound and at least one second gaseous compound less polar than the polar first gaseous compound, in which process at least the polar first gaseous compound present in the gas mixture is adsorbed on an adsorbent according to the invention.

Depending on the case, the process according to the invention may also comprise one or more of the following characteristics:

- the gas mixture to be purified or to be separated is chosen from: mixtures containing oxygen and nitrogen, particularly air, mixtures containing carbon monoxide and hydrogen, and hydrocarbons, especially olefins;
- it is of the PSA or VSA type and the gas mixture is air, the polar first gaseous compound being nitrogen and the less-polar second gaseous compound being oxygen;
- it is of the PSA type and the gas mixture is a mixture containing hydrogen and/or CO and/or $CO_2$, the polar first gaseous compound being $CO_2$ and the less-polar second gaseous compound being at least hydrogen;
- the gas mixture is at a temperature ranging from −50° C. to +300° C., at an adsorption pressure ranging from 1 bar to 100 bar and/or at a desorption pressure ranging from 0.1 bar to 10 bar.

DETAILED DESCRIPTION OF THE INVENTION

The invention will be more clearly understood by virtue of the explanations given below by way of illustration, but implying no limitation, and with reference to the appended figures.

The adsorption isotherms for oxygen were measured at 20° C. in a commercial pressure gauge apparatus, MICROMERTICS ASAP 2405, for various natural, commercial or laboratory-synthesized zeolites.

The materials used and the results obtained are given in the following table:

TABLE

| Structure of the adsorbent | Composition of the adsorbent | Pore diameter (Å) | Oxygen adsorptivity at 1 bar |
|---|---|---|---|
| FER | $Si_{30}Al_6Na_2Mg_2O_{72}$ | 3.5 | 8.6 |
| CHA | $Si_{24}Al_{12}Ca_6O_{72}$ | 3.8 | 8.5 |
| MFI | $Si_{80}Al_{16}Na_{16}O_{192}$ | 5.3 | 6.4 |
| MOR | $Si_{40.4}Al_{7.6}Na_{0.9}Li_{7.1}O_{96}$ | 6.7 | 5.9 |
| MAZ | $Si_{16}Al_{10}Na_{10}O_{72}$ | 7.4 | 5.8 |
| ETS-10 | $Si_{37}Ti_{10.1}Na_{14.72}Ka_{4.7}O_{104}$ | 7.6 | 4.8 |
| KFI | $Si_{72}Al_{24}Cs_{5.8}Li_{18.2}O_{192}$ | 10 | 4.7 |
| FAU (Y) | $Si_{132}Al_{60}Na_{10.8}Li_{49.2}O_{72}$ | 12.4 | 2.5 |
| FAU (X) | $Si_{102.7}Al_{89.3}Li_{89.3}O_{72}$ | 12.4 | 3.0 |
| OTMA | Si | 18 | 1.5 |
| CTMA | Si | 32 | 1.3 |

Figure 2:
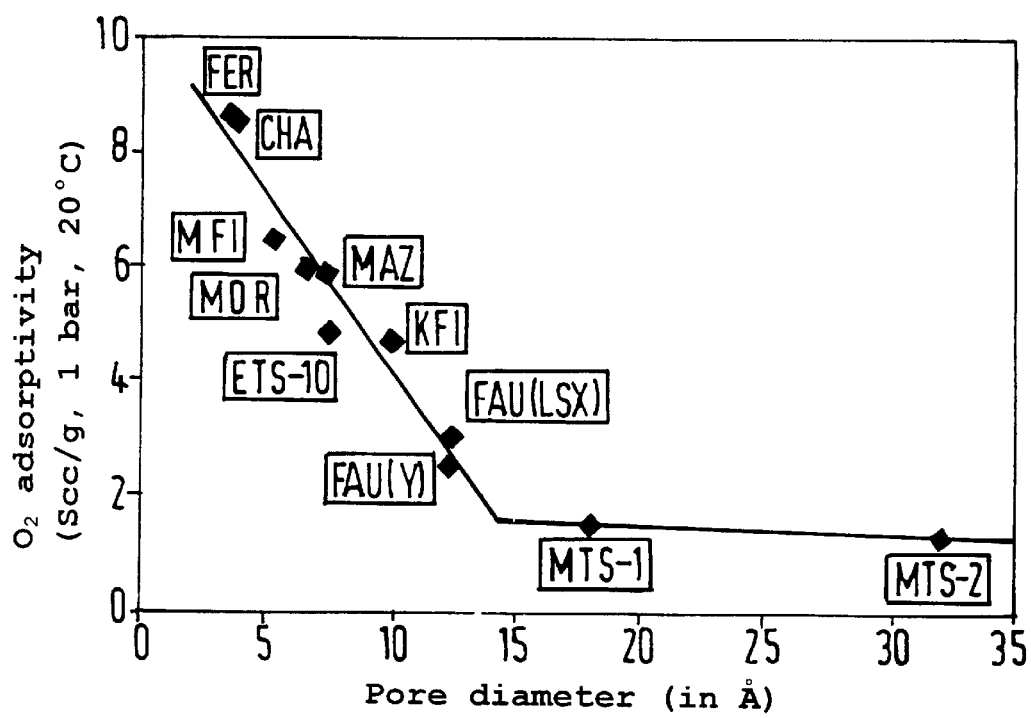

The results obtained, namely the oxygen adsorptivities measured at 1 bar and 20° C. for these various zeolitic adsorbents, are plotted as a function of the pore size of the adsorbents in FIG. 2 appended hereto.

These results obtained clearly show, surprisingly, a constant reduction in the oxygen adsorptivity with an increase in pore diameter up to a value of 1.4 nm.

Above this diameter, the oxygen adsorptivity changes only very little with an increase in diameter.

Thus, the invention is particularly suitable for the separation of gas mixtures for the purpose of producing less-polar molecules by selective adsorption of more-polar molecules by making use of adsorbent materials having improved selectivity, having pore apertures greater than 1.4 nm.

What is claimed is:

1. In a process for separating or for purifying a gas mixture containing at least one polar first gaseous compound and at least one second gaseous compound less polar than said polar first gaseous compound, which comprises: adsorbing at least said polar first gaseous compound present in said gas mixture on a porous adsorbent, the improvement wherein said porous adsorbent comprises pores having a pore diameter (Dm) of between 1.4 nm and 14 nm, and an oxygen adsorptivity, measured at +20° C. and 1 bar, of at most about 2 Scc/g.

2. The process according to claim 1, wherein the pore diameter (Dm) is less than 10 nm.

3. The process according to claim 2, wherein the pore diameter (Dm) is less than or equal to 5 nm.

4. The process according to claim 1, wherein the oxygen adsorptivity, measured at +20° C. and 1 bar, is 1.5 Scc/g.

5. The process according to claim 1, wherein the oxygen adsorptivity, measured at +20° C. and 1 bar, is 1.3 Scc/g.

6. The process according to claim 1, wherein said adsorbent comprises an adsorbent active phase and at least one inert binder.

7. The process according to claim 6, wherein the adsorbent active phase is chosen from crystalline or amorphous cationic porous materials.

8. The process according to claim 6, wherein the inert binder is chosen from clays, silicas, aluminas and alumino-silicates.

9. The process according to claim 6, wherein the ratio of the proportion by weight of adsorbent active phase to the proportion by weight of inert binder is from 95/5 to 5/95.

10. The process according to claim 9, wherein the ratio of the proportion by weight of adsorbent active phase to the proportion by weight of inert binder is from 50/50 to 90/10.

11. The process according to claim 6, wherein the adsorbent active phase contains one or more metal cations selected from lithium, calcium, zinc or boron cations or cations chosen from Groups I, II, VII, X, XI, XII, and F from the Periodic Table of Elements according to IUPAC, said adsorbent having a zeolitic phase exchanged to at least 80% with one of more metal cations.

12. The process according to claim 1, wherein the gas mixture to be purified or to be separated is chosen from:

mixtures containing oxygen and nitrogen;

mixtures containing carbon monoxide and hydrogen; and hydrocarbons.

13. The process according to claim 1, wherein said process is a PSA or VSA process, the gas mixture is air; the polar first gaseous compound is nitrogen; and the less-polar second gaseous compound is oxygen.

14. The process according to claim 1, wherein said process is a PSA process; the gas mixture is a mixture containing at least one of hydrogen, CO, and $CO_2$; the polar first gaseous compound is $CO_2$; and the less-polar second gaseous compound is at least hydrogen.

* * * * *